(12) United States Patent
Bortolussi et al.

(10) Patent No.: US 9,179,609 B2
(45) Date of Patent: Nov. 10, 2015

(54) GUIDE AND FASTENING DEVICE FOR PLANT SUPPORT WIRES

(71) Applicants: Claudio Bortolussi, Fiume Veneto (IT); Franco Bortolussi, Fiume Veneto (IT)

(72) Inventors: Claudio Bortolussi, Fiume Veneto (IT); Franco Bortolussi, Fiume Veneto (IT)

(*) Notice: Subject to any disclaimer, the term of this patent is extended or adjusted under 35 U.S.C. 154(b) by 0 days.

(21) Appl. No.: 14/352,124

(22) PCT Filed: Oct. 23, 2012

(86) PCT No.: PCT/EP2012/070955
§ 371 (c)(1),
(2) Date: Apr. 16, 2014

(87) PCT Pub. No.: WO2013/079262
PCT Pub. Date: Jun. 6, 2013

(65) Prior Publication Data
US 2014/0250779 A1    Sep. 11, 2014

(30) Foreign Application Priority Data
Nov. 28, 2011   (IT) .............................. PN20110035 U

(51) Int. Cl.
*A01G 17/08* (2006.01)
*A01G 17/04* (2006.01)
*A01G 17/06* (2006.01)
*A01G 17/14* (2006.01)

(52) U.S. Cl.
CPC ............... *A01G 17/04* (2013.01); *A01G 17/06* (2013.01); *A01G 17/14* (2013.01)

(58) Field of Classification Search
CPC .... A01G 9/12; A01G 17/06; A01G 2017/065
USPC .............. 47/70, 83, 44, 46, 47; 248/530, 539
IPC ......................... A01G 9/12,17/06, 17/08, 17/14
See application file for complete search history.

(56) References Cited

U.S. PATENT DOCUMENTS

| | | | | |
|---|---|---|---|---|
| 3,391,492 A * | 7/1968 | Attruia | | 47/47 |
| 3,526,993 A * | 9/1970 | Siebol | | 47/46 |
| 3,585,755 A * | 6/1971 | Thomas | | 47/45 |
| 4,164,094 A * | 8/1979 | Kempka | | 47/47 |
| 4,165,582 A * | 8/1979 | Skaug | | 47/44 |

(Continued)

FOREIGN PATENT DOCUMENTS

| | | |
|---|---|---|
| EP | 2 324 700 A1 | 5/2011 |
| WO | WO 2005/048691 A2 | 6/2005 |
| WO | WO 2011/131468 A1 | 10/2011 |

OTHER PUBLICATIONS

Feb. 5, 2012 International Search Report issued in International Application No. PCT/EP2012/070955.

(Continued)

*Primary Examiner* — Lisa Tsang
(74) *Attorney, Agent, or Firm* — Oliff PLC

(57) ABSTRACT

Guide and fastening device for plant support wires, in particular for rows of grapevines, the device having at least one pair of vertical upright elements, fastened to a head pole and provided with longitudinal guides within which are made to slide fastening elements for the lateral containment wires for the growing vegetation. To each pair of upright elements for the lateral containment wires is associated a further vertical upright provided with a guide within which is made to slide a fastening element for at least one carrying wire.

16 Claims, 5 Drawing Sheets

(56) References Cited

U.S. PATENT DOCUMENTS

| | | | |
|---|---|---|---|
| 4,176,494 A * | 12/1979 | Boucher et al. | 47/47 |
| 4,642,940 A * | 2/1987 | Ettema et al. | 47/44 |
| 5,638,636 A * | 6/1997 | Hiyama et al. | 47/44 |
| 6,578,318 B1 * | 6/2003 | Clark | 47/58.1 FV |
| 6,935,065 B1 * | 8/2005 | Oliver | 42/94 |
| 6,948,277 B2 * | 9/2005 | Parrish | 47/70 |
| 7,571,567 B2 * | 8/2009 | Bortolussi | 47/46 |
| 2009/0308767 A1 * | 12/2009 | Brydon | 206/315.3 |

OTHER PUBLICATIONS

Feb. 5, 2012 Written Opinion issued in International Application No. PCT/EP2012/070955.

* cited by examiner

GUIDE AND FASTENING DEVICE FOR PLANT SUPPORT WIRES

The present invention relates to a guide and fastening device for plant training wires, particularly suitable for use in the viticultural field.

BACKGROUND OF INVENTION

In the viticultural field, a well-known practice is to prearrange vine support structures consisting of rows of poles driven into the ground so as to form rows of grapevines. The poles are spaced at regular distances and are connected at a certain height from the ground by at least one fixed horizontal wire, called "carrying wire" or "training wire".

On the two poles located at the head of each row, called "head poles", is also fastened at least one pair of parallel wires arranged on respective sides of each pole in the row. These wires are commonly called "containment wires" or "movable wires" because, during the different phases of cultivation of the plants, they are moved to different heights above the ground to contain and arrange the growing vegetation according to a desired configuration. This is a particularly laborious operation.

Italian Patent application PN2010A000023, filed by the same holders of the present application, describes a fastening device for the "movable wires" of a row of plants, in particular grapevines, which foresees connecting the movable wires to vertical guide elements associated to the end or head poles. The ends of the movable wires are fastened to mounting means that are inserted and can slide within the guides formed in the vertical guide elements, so as to modify the height of the movable containment wires and adapt it to the growing vegetation.

This solution is advantageous, but it does not offer the possibility of optimizing at another moment the position of the training wire and of the second wire, and of any third fixed wire, if present, that are located higher than the training wire having a support function. Moreover, it does not completely solve the problem of pruning the vine shoots after the grapes have been harvested. In effect, automatic machines have been built that move along the rows and are provided with means for lifting and cutting the vegetation. However, these machines cannot perform satisfactorily in the area at the head of the rows, that is in the area that goes from the head pole to the first plant support pole.

European Patent Application EP 2 324 700 A1 describes an elastic compensation device for the movable wires in viticultural systems. This device includes a first fastening element for connection to a head pole in the row and a second fastening element to receive at least one pair of movable wires. The first and the second fastening elements are interconnected by an elastic element and are both arranged at the same end of said elastic element, so as to apply only a compression force on the latter. Wire-tensioning means are also provided in opposite positions with respect to the elastic element to engage the pairs of containment wires and to make it possible to adjust their tension. However, the solution described in Patent Application EP 2 324 700 A1 is not adaptable to a "training wire" and is bound to the use of a specific tensioning means.

SUMMARY OF THE INVENTION

The main objective of the present invention is to propose a guide and support device for the "training wires" on rows of grapevines that makes it possible to make the most complete use, that is, as far as the ends of the rows of vines, of the automatic machines for pruning vine-shoots.

In addition, an objective of the invention is also to be able to vary and optimize the position of the support wires in a simple manner and as necessary.

Another objective of the present invention is to propose a device that is simple and quick to install, being made up of a minimum number of component pieces.

A still further objective of the present invention is to propose a single guide and support device for both the training wires and the containment wires that is particularly rational, compact and solid, so as to support all types of stresses to which it may be subjected.

These and other objectives are achieved with a tensioning device having the characteristics specified in the claims of the present patent.

Advantages and details of the invention will become clear from the following description, given by way of non-limiting example, with reference to the enclosed drawings, wherein.

DETAILED DESCRIPTION OF THE INVENTION

Figure 1A:
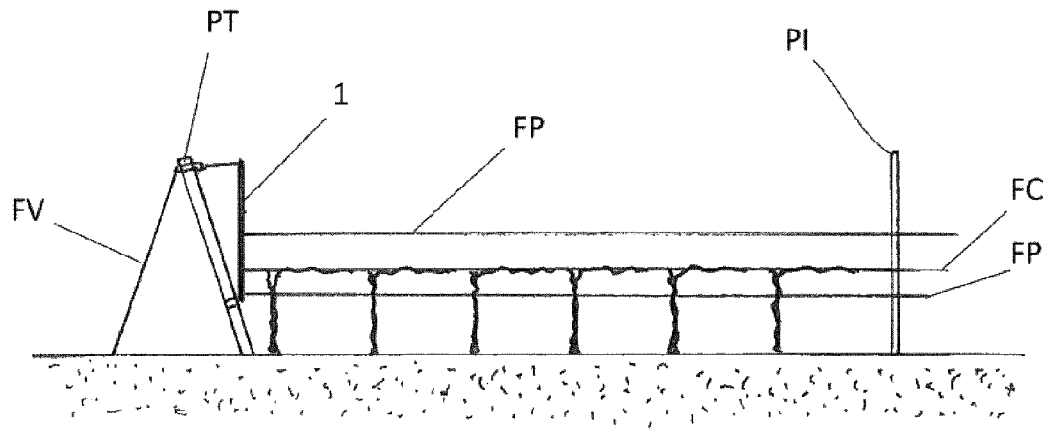
FIGS. 1A to 1C illustrate the head portions of a row of plants, in particular grapevines, equipped with a guide and support device for movable wires in a first embodiment of the invention, with the vegetation in different stages of growth.
Figure 1B:
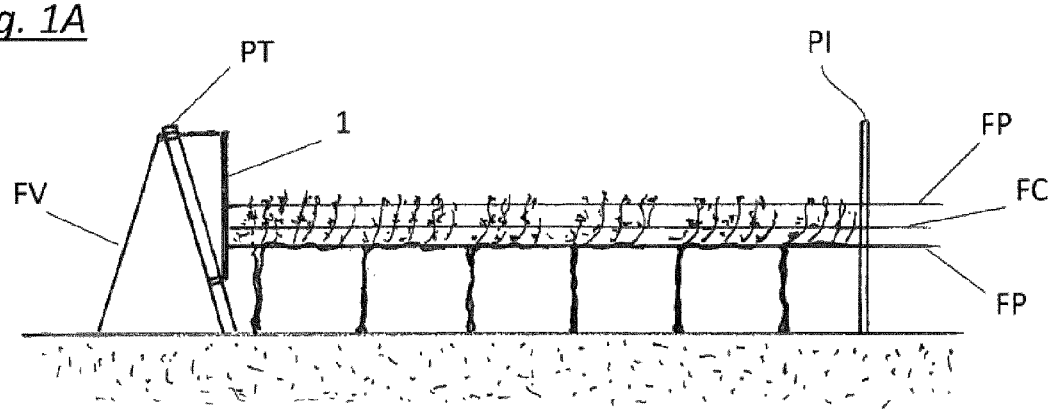
Figure 1C:
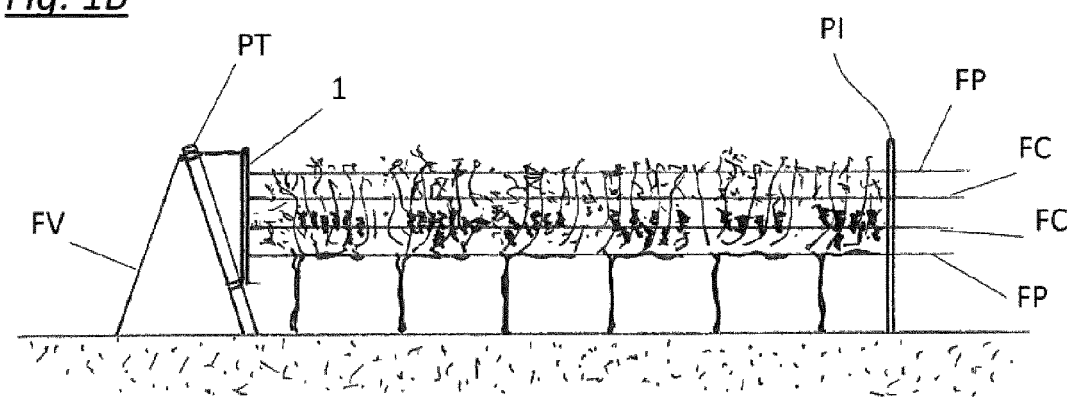
Figure 2:
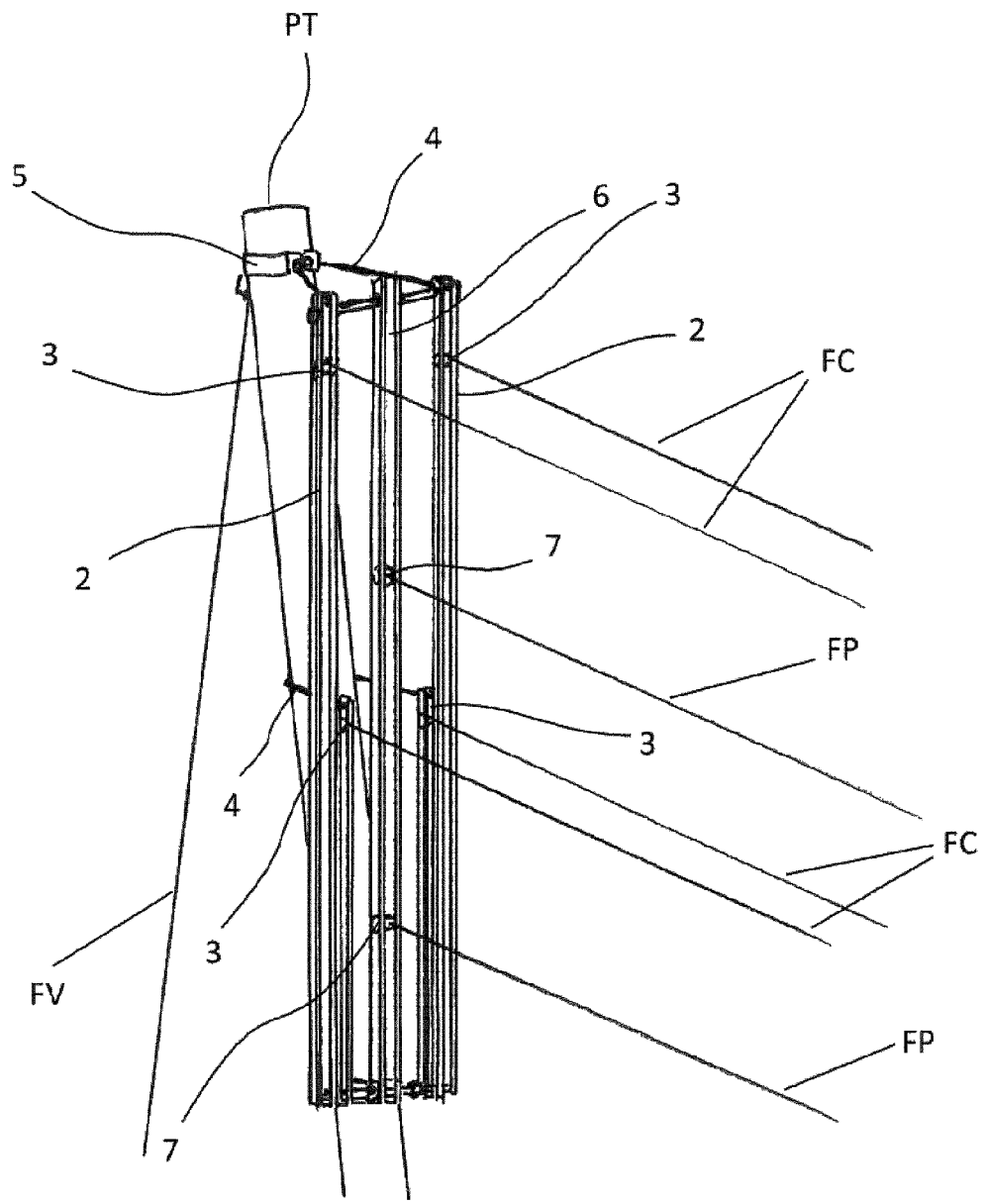
FIG. 2 is a perspective view of the device according to the invention installed on a head pole of a row of plants.
Figure 3:
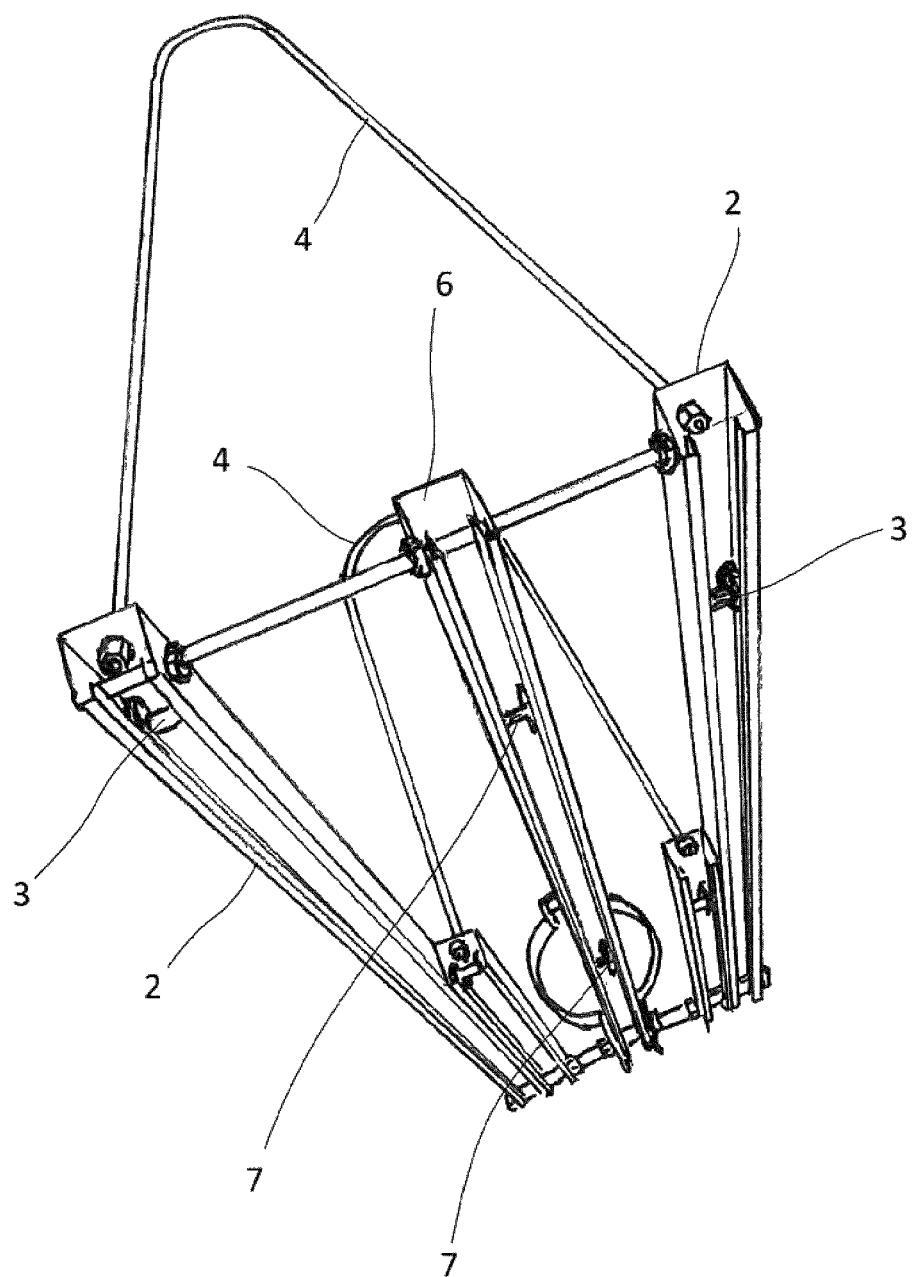
FIG. 3 is a perspective view from above of the device of FIG. 2.
Figure 4:
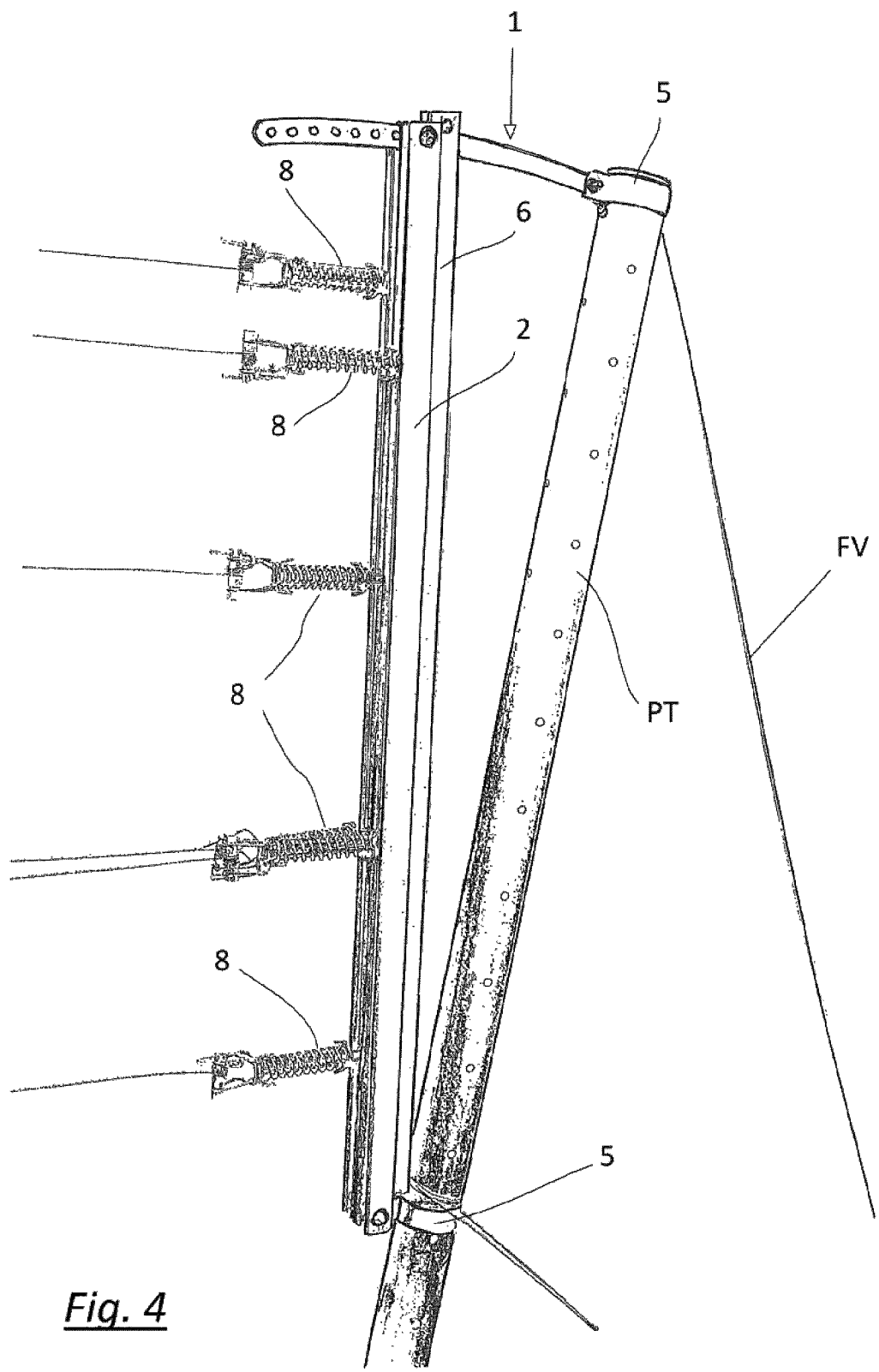
FIG. 4 is a view of the upper end of the head pole of a row of plants provided with the device according to the invention in a second embodiment.
Figure 5:
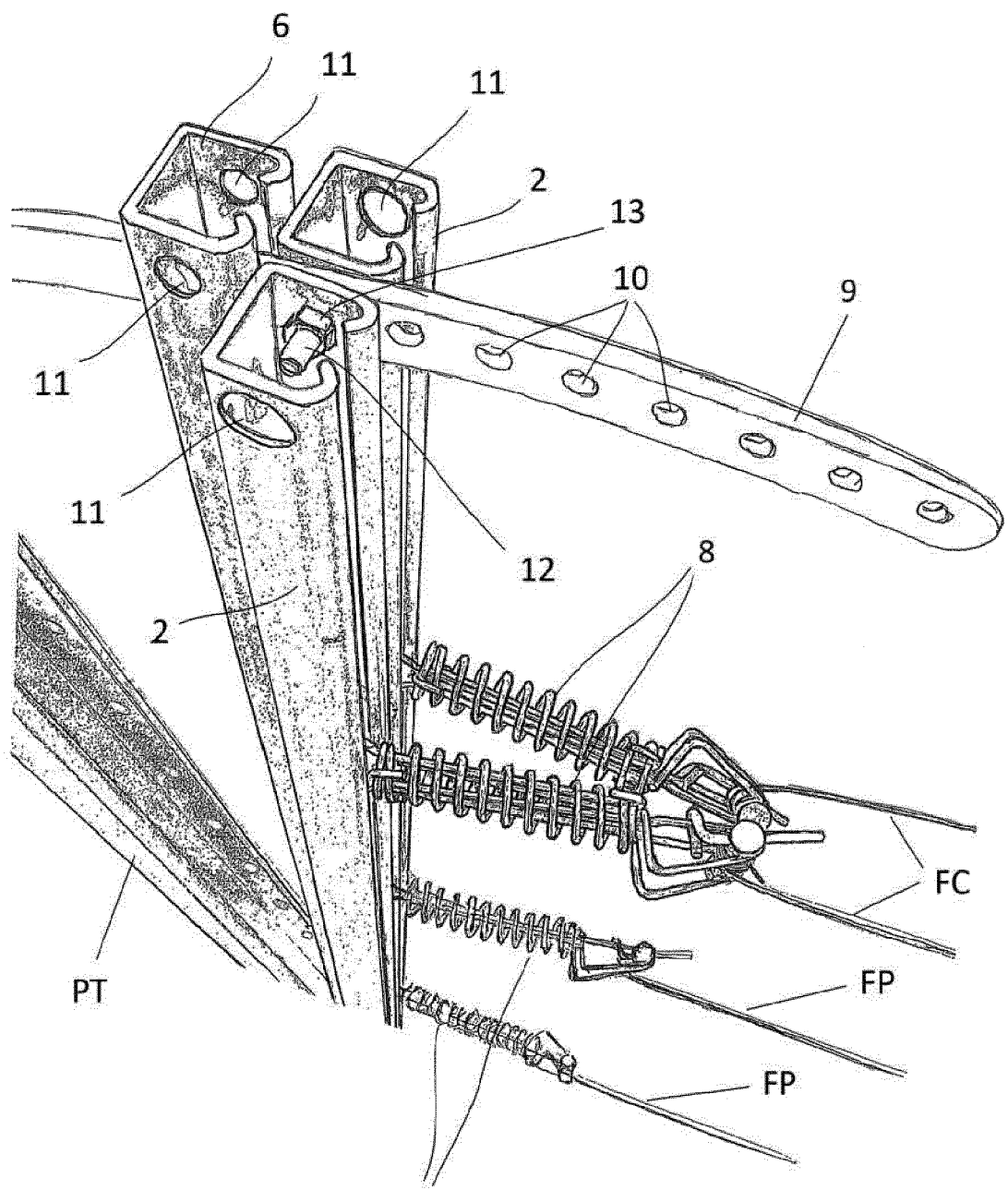
FIG. 5 is a perspective view from above of an enlarged detail of the device of FIG. 4.

The head portion of a row of plants, in particular grapevines, shown in FIGS. 1A to 1C, includes a head pole PT and an intermediate pole PI. The head pole PT is driven into the ground, generally inclined from the vertical plane and is suitably braced by relative bracing wires FV. The intermediate pole PI is instead driven into the ground in a substantially vertical position.

On the head pole PT is mounted a compensation device 1, to which are fastened the ends of the containment wires FC. The compensation device includes a pair of guides 2 within which slide respective fastening means 3.

The device 1 must guarantee that the guides 2 are as much as possible vertical, so as to enable the displacement of the containment wires FC.

To the fastening means 3 are fastened the ends of the containment wires FC, which are kept spaced apart laterally so as to guide between them the grown vegetation and follow it as it grows upward. The guides 2 are connected and fastened to the head pole PT by means of brackets 4 and collars 5.

The detailed description of this solution is omitted, as reference to the constructive details is made in Patent Application PN2010A000023 previously mentioned.

According to the invention, the compensation device 1 includes a further guide 6 that is associated to the guides 2, in an intermediate position between them. In the guide 6 are mounted sliding means 7, similar to the fastening means 3. The ends of the training wires FP are connected to the fastening means 7, so as to allow the vertical displacement of the wires.

Naturally, the vertical positioning of the wires can be assured with known fastening means, such as pins to insert in relative holes in the guides; such pins are preferably connected to the guides through chains, so as to avoid scattering them. As an alternative, elastic split pins or similar means can be used for this purpose.

Preferably, the training wires FP and the containment wires FC are connected to the fastening means 3 and 7 through cushioning means 8 of known type.

In particular, in a second embodiment, the compensation device 1 is made adjustable by connecting the vertical guides 2 and 6 to the head pole PT through a curved bracket 9 provided with a plurality of equally spaced holes 10. Correspondingly, the vertical guides 2 and 6 are provided with holes 11 near their upper ends. The holes 10 on the bracket 9 and the holes 11 on the guides 2 and 6 receive a threaded pin 12 that is locked by a nut 13.

This solution makes it possible to adapt the position of the compensation device 1 and the tensioning of the training and containment wires to adapt them to the characteristics of the growing vegetation in the row of vines.

The new solution was studied to make it more advantageous to carry out the pruning and defoliation operations performed with automatic machines, allowing the vertical displacement of the training wires FP, while keeping them parallel to the ground.

In fact, up to now the ends of the training wires FP were connected in fixed positions on the head poles PT, and thus in the portion of a rows of plants between the head pole PT and the first intermediate pole PI the training wires FP were inclined upward so as to be guided toward the pruning machines. Consequently, the pruning of the plants was irregular in the head portions of the rows of plants, or had to be carried out manually, demanding time and effort from the operator.

With the solution according to the invention, there is also the advantage of enabling the training wires FP to be displaced vertically, even independently of the pruning operation, so as to simply adapt the system to the type of training of the specific plants.

The invention claimed is:

1. A guide and fastening device for plant support wires for use with rows of grapevines, the guide and fastening device comprising:
    at least one pair of vertical upright elements, the vertical upright elements being fastened to a head pole and each vertical upright element being provided with a vertical guide including an open or closed cross-section, where a shape of an outermost surface of the open or closed cross-section forms one or more sliding paths, the vertical guide having at least one fastening element that slides along a longitudinal length of the vertical guide, the at least one fastening element being rolling members or a sliding body connected to a lateral vegetation containment wire; and
    a further vertical upright element provided with a further vertical guide including an open or closed cross-section, where a shape of an outermost surface of the open or closed cross-section forms one or more sliding paths, the further vertical guide having a further fastening element that slides along a longitudinal length of the further vertical guide, the further fastening element being rolling members or a sliding body connected to at least one training wire.

2. The guide and fastening device for plant support wires as in claim 1, wherein pins are inserted into holes in the vertical guides of the at least one pair of vertical upright elements and the further upright element for positioning of the respective fastening elements of the pair of vertical upright elements and the further vertical upright element.

3. The guide and fastening device for plant support wires as in claim 1, wherein the further vertical upright element is disposed between each of the at least one pair of vertical upright elements in an intermediate position.

4. The guide and fastening device for plant support wires as in claim 1, wherein the lateral vegetation containment wire and the at least one training wire are each capable of moving independently in a vertical direction.

5. The guide and fastening device for plant support wires as in claim 1, wherein the head pole is tilted at an angle away from ends of the lateral vegetation containment wire and the at least one training wire such that the vertical upright elements and the further vertical upright element are vertically oriented via brackets.

6. The guide and fastening device for plant support wires as in claim 1, wherein the vertical guides of the at least one pair of vertical upright elements and the further vertical upright element are connected to the head pole by a curved bracket provided with a plurality of holes that correspond to holes formed on the vertical guides.

7. The guide and fastening device for plant support wires as in claim 6, wherein pins are inserted into holes in the vertical guides of the at least one pair of vertical upright elements and the further vertical upright element for positioning of the fastening elements.

8. The guide and fastening device for plant support wires as in claim 1, wherein the further fastening element includes two further fastening elements, one of the two further fastening elements connected to a lower training wire, and the other of the two further elements connected to an upper training wire, the two further fastening elements each being capable of sliding along a longitudinal length of the further vertical guide.

9. The guide and fastening device for plant support wires as in claim 8, wherein pins are inserted into holes in the vertical guides of the at least one pair of vertical upright elements and the further vertical upright element for positioning of the fastening elements.

10. The guide and fastening device for plant support wires as in claim 8, wherein the vertical guides of the vertical upright elements and the further vertical upright element are connected and fastened to the head pole by brackets and collars.

11. The guide and fastening device for plant support wires as in claim 8, wherein the vertical guides of the at least one pair of vertical upright elements and the further vertical upright element are respectively connected to the head pole by a curved bracket provided with a plurality of holes that correspond to holes formed on the vertical guides of the at least one pair of vertical upright elements and the further vertical upright element.

12. The guide and fastening device for plant support wires as in claim 11, wherein pins are inserted into holes in the vertical guides of the at least one pair of vertical upright elements and the further vertical upright element for positioning of the fastening elements.

13. The guide and fastening device for plant support wires as in claim 8, wherein at least one cushioning means connects: (i) the at least one training wire to one of the two further fastening elements and (ii) the lateral vegetation containment wire to the at least one fastening elements.

14. The guide and fastening device for plant support wires as in claim 13, wherein pins are inserted into holes in the vertical guides of the at least one pair of vertical upright elements and the further vertical upright element for positioning of the fastening elements.

15. The guide and fastening device for plant support wires as in claim 13, wherein the vertical guides of the at least one pair of vertical upright elements and the further vertical upright element are respectively connected to the head pole by a curved bracket provided with a plurality of holes that correspond to holes formed on the vertical guides of the at least one pair of vertical upright elements and the further vertical upright element for connection by a threaded pin and nut.

16. The guide and fastening device for plant support wires as in claim 15, wherein pins are inserted into holes in the vertical guides of the at least one pair of vertical upright elements and the further vertical upright element for positioning of the fastening elements.

* * * * *